United States Patent [19]

Saima et al.

[11] Patent Number: 5,084,641
[45] Date of Patent: Jan. 28, 1992

[54] AIR-COOLED TYPE INDUCTION MOTOR FOR USE IN VEHICLES HAVING MEANS TO REDUCE EXHAUST AIR NOISE

[75] Inventors: Tooru Saima, Tokyo; Takashi Nagayama, Yokohama; Kazuyuki Fujiwara, Tokyo, all of Japan

[73] Assignee: Kabushiki Kaisha Toshiba, Kawasaki, Japan

[21] Appl. No.: 607,689

[22] Filed: Nov. 1, 1990

[30] Foreign Application Priority Data

Nov. 6, 1989 [JP] Japan .................. 1-287371

[51] Int. Cl.⁵ .............. H02K 5/24; H02K 9/02; H02K 9/04; F01N 1/06
[52] U.S. Cl. .................. 310/51; 310/52; 310/58; 181/206; 181/200
[58] Field of Search ............ 310/51, 52, 53, 58, 310/59, 60 R, 60 A, 62, 63, 65, 61, 166; 181/204, 211, 212, 229, 206, 200

[56] References Cited

U.S. PATENT DOCUMENTS

| | | | |
|---|---|---|---|
| 2,610,992 | 9/1952 | Johns et al. | 310/59 |
| 3,407,317 | 10/1968 | Honsinger | 310/58 |
| 4,250,417 | 2/1981 | Arnold | 310/62 |
| 4,275,321 | 6/1981 | Shimamoto et al. | 310/59 |
| 4,766,337 | 8/1988 | Parkinson et al. | 310/58 |

FOREIGN PATENT DOCUMENTS

| | | | |
|---|---|---|---|
| 0023197 | 11/1930 | Australia | 310/60 |
| 123312 | 2/1931 | Austria . | |
| 0416468 | 3/1991 | European Pat. Off. . | |
| 2315937 | 12/1973 | Fed. Rep. of Germany . | |
| 0015110 | 2/1979 | Japan | 310/51 |
| 0049648 | 5/1981 | Japan | 310/52 |
| 0029341 | 2/1983 | Japan | 310/58 |
| 61-94545 | 5/1986 | Japan . | |
| 62-11371 | 1/1987 | Japan . | |
| 0043547 | 2/1988 | Japan | 310/60 R |
| 2001481 | 1/1979 | United Kingdom | 310/58 |

OTHER PUBLICATIONS

"On The Induction Motor For Use With Vehicles" of a magazine "Science of Electric Cars", Feb. edition, 1988, pp. 18-23.

*Primary Examiner*—Steven L. Stephan
*Assistant Examiner*—C. La Balle
*Attorney, Agent, or Firm*—Oblon, Spivak, McClelland, Maier & Neustadt

[57] ABSTRACT

The air-cooled type induction motor used for railway vehicles such as the electric car generates sound waves (noise) which are uncomfortable to the ears of the human being when it is rotated. An induction motor according to the present invention has therein a plurality of waveguide (or air guide) plates for efficiently exhausting air, which serves to cool the motor, outside the motor. These waveguide plates are arranged not to resonate with the frequency of the sound waves which are generated by the cooling air. The sound waves are guided outside the motor through the waveguide plates before it is amplified to a noise level which is uncomfortable to the ears of the human being. Noise caused when the motor is rotated at high speed can be thus eliminated.

14 Claims, 7 Drawing Sheets

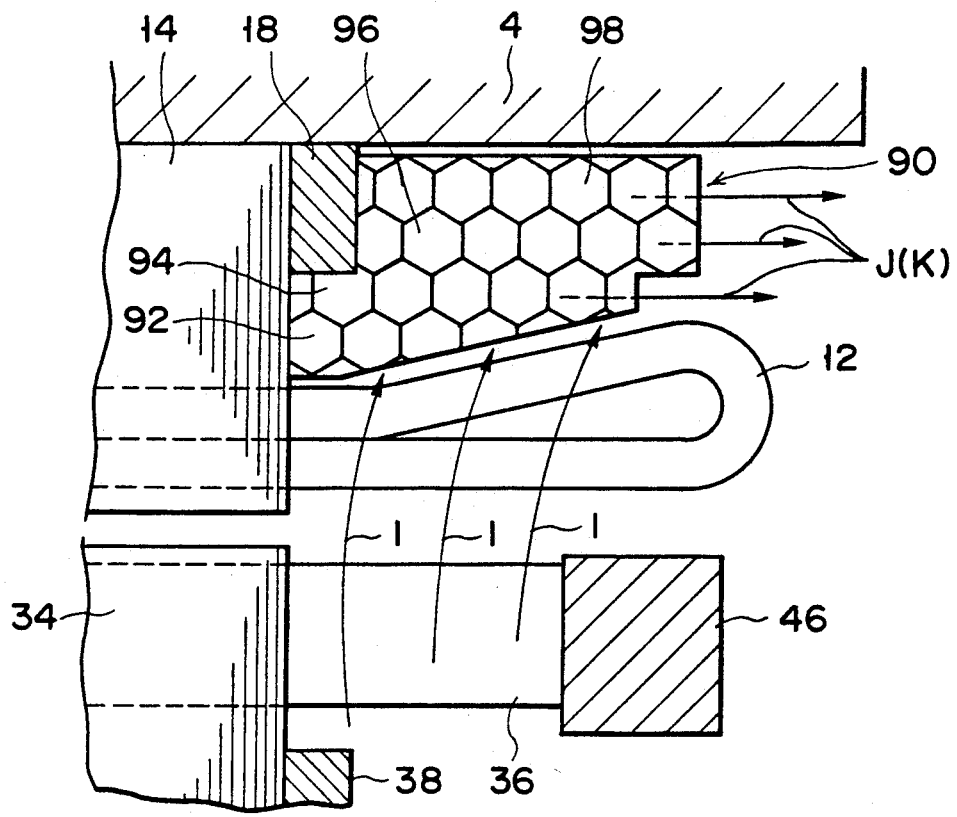
F I G. 5A
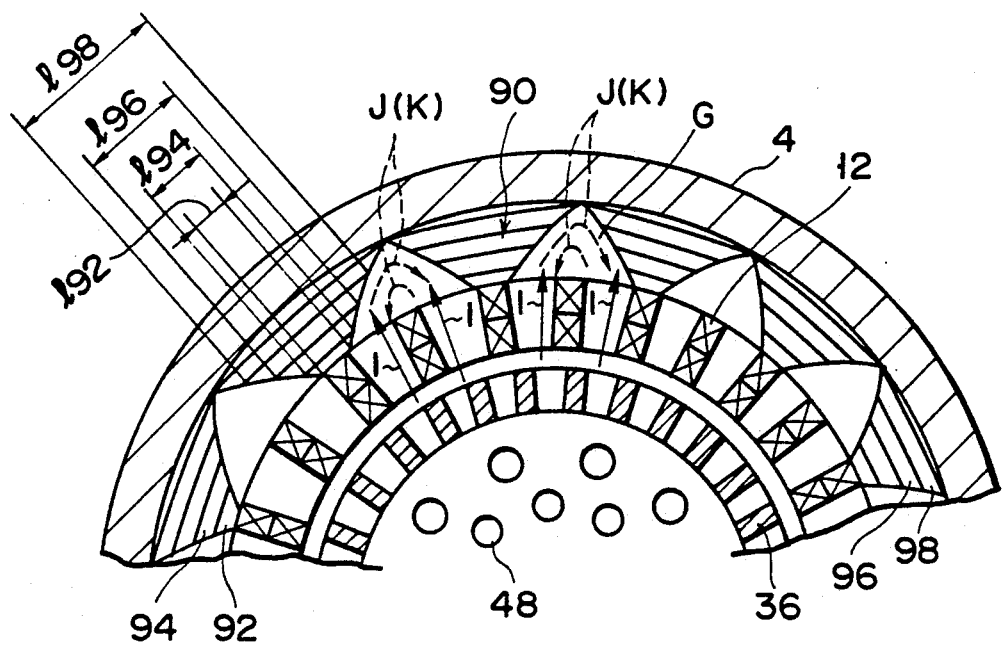
F I G. 5B

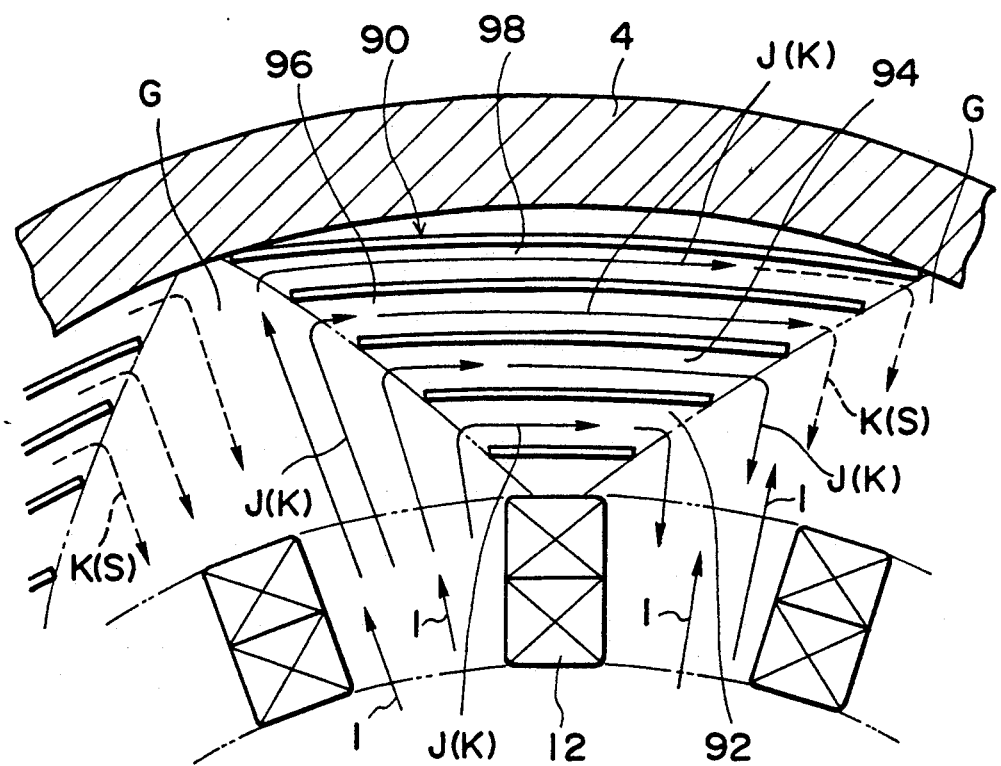
F I G. 5C

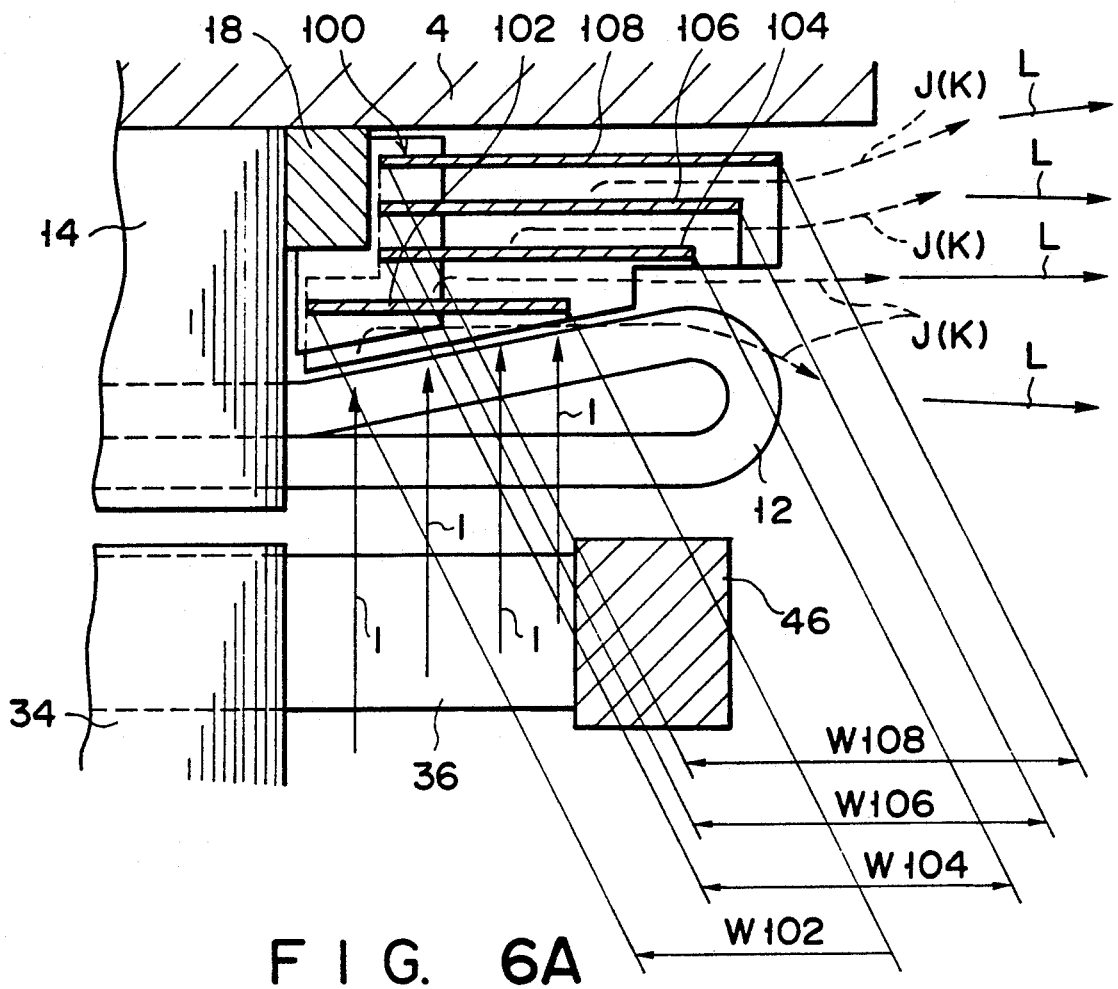
F I G. 6A
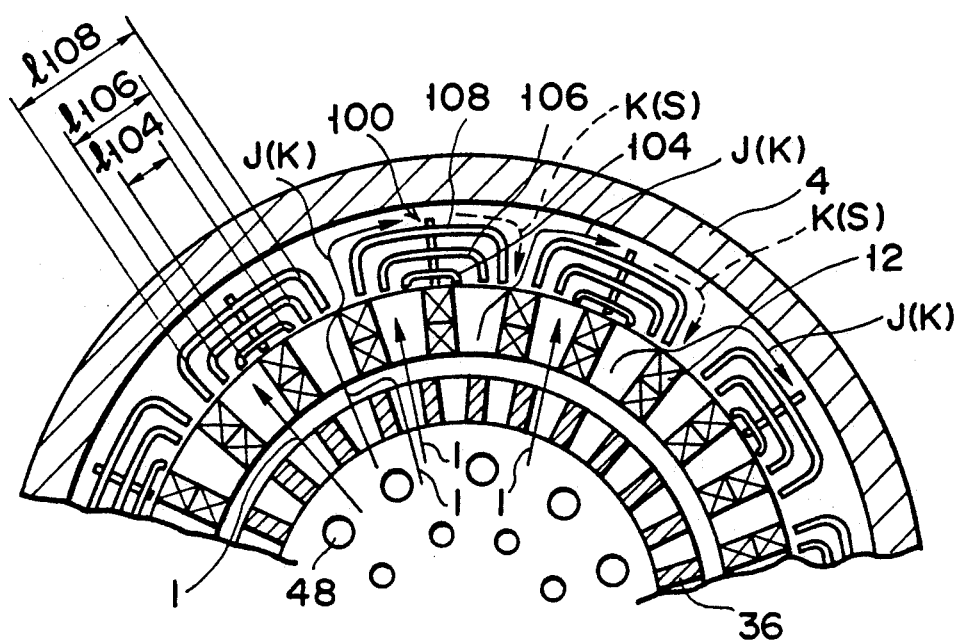
F I G. 6B

AIR-COOLED TYPE INDUCTION MOTOR FOR USE IN VEHICLES HAVING MEANS TO REDUCE EXHAUST AIR NOISE

BACKGROUND OF THE INVENTION

1. Field of the Invention

The present invention relates to an electric motor used for railway vehicles such as the electric car, and more particularly, it relates to an air-cooled type induction motor capable of taking air into the motor to cool the motor.

2. Description of the Related Art

Some of the air-cooled type motors are disclosed in a chapter titled "On The Induction Motor For Use With Vehicles" in the magazine "SCIENCE OF ELECTRIC CARS", February edition, 1988, pages 18–23, in published Unexamined Japanese Patent Application No. 61-94545, and also Utility Model Application No. 62-11371. As apparent from these references, the squirrel-cage type induction motor which can be controlled by VVVF inverters is now being used as the main motor for railway vehicles such as the electric train. The induction motor has no brushes. This enables the motor to require less maintenance, rotated at a higher speed, and made smaller in size, lighter in weight and larger in capacity.

The air-cooled squirrel-cage type induction motor includes a stator and a rotor. The stator includes stator core, coils and the like. The stator core is fixed to the inner circumference of the housing or frame of the motor. The stator coils are incorporated into inner circumferential portions of the stator core. Further, bearings for supporting the rotor in a smoothly rotatable state are arranged around the center of each of both end plates which form a part of the frame and which hold the rotor between them. The rotor includes a rotor shaft, a rotor core, a plurality of rotor bars, two end rings and the like. Both ends of the rotor shaft are supported rotatable by bearings The rotor core is fixed to the rotor shaft. The plurality of rotor bars are incorporated into the outer circumferential portion of the rotor core. Both ends of each of these rotor bars are connected to the end rings.

In the case of the air-cooled motor having the above-described structure, a moving magnetic field is generated from the stator coils when current is supplied to them. When this moving magnetic field crosses the rotor bars, an electromotive force is derived. The rotor is rotated by interaction between the current and magnetic field generated.

In the case of this air-cooled motor, a large amount of heat is generated from the stator and the rotor when the motor is being rotated. When the stator coils and the rotor bars are heated by this heat to temperatures higher than predetermined ones, the insulating capacity of the stator coils is deteriorated while the strength of material of which the rotor bars are made is lowered. In order to prevent this, outside air is taken into the motor to cool its inside when it is being rotated.

This air-cooled motor is provided with an air inlet port at one end thereof in the axial line around which the stator is rotated. Further, an air outlet port is formed at the other end of the motor. Furthermore, a gap is formed between the stator core and the rotor core, and a plurality of ventilating holes are formed in the rotor core in the rotor, extending along the axial line around which the rotor core is rotated.

The induction motors of this kind are grouped into the ones of the forcedly-cooling type in which cooling air is forcedly fed from outside into the frame through the air inlet port, using a fan located outside the motor, and the ones of the induced type in which an impeller fixed to the rotor shaft is located in the frame and rotated together with the rotor to take the cooling air into the frame through the air inlet port.

The cooling air introduced into the frame is taken into one end of the stator core and blown out of the other end thereof, passing through the plurality of ventilating holes. This cooling air is finally exhausted outside the frame through the air outlet. The stator coils, the rotor bars and the like in the frame are cooled by the cooling air which passes through the frame.

The above-described induction motor is provided with a plurality of narrow ventilating holes through which the cooling air is circulated. Sound waves (or noise) having an uncertain frequency are generated by the cooling air thus circulated. The frequency of the sound waves changes as the rotation number of the motor is increased (the vehicle is accelerated) or decreased (the vehicle is decelerated). This noise is harsh to the ears of the human being and it makes passengers in the vehicle feel uncomfortable. When the motor is used for railway trains, for example, the noise is feared to cause a public nuisance to those people who live along the railroad. Further, in the case where the noise is increased when the motor comes to or near to its usually-used rotation number, the vehicles cannot be practically run on roads or railroads.

SUMMARY OF THE INVENTION

An object of the present invention is therefore to provide an induction motor capable of keeping noise low while it is being rotated.

Another object of the present invention is to provide an induction motor smaller in size but larger in output capacity.

A further object of the present invention is to provide an induction motor sufficiently resistant to vibration.

According to the present invention, there can be provided an air-cooled type induction motor for use in vehicles comprising a cylindrical housing having an axis, an air inlet into which cooling air is supplied, and an air outlet which exhausts the cooling air, a stator for generating a magnetic field, the stator including an annular core coaxially fitted in the housing and located between the air inlet and the air outlet, and a plurality of stator coils having coil ends which extend from the core to the air outlet and which face to the inner circumferential surface of the housing with a space therebetween, a rotor coaxially arranged inside the core with a predetermined gap through which the cooling air flows from the air inlet to the air outlet and rotatable about the axis of the housing, the rotor having a shaft coaxial with the axis of the housing, a plurality of ventilating holes extending through the rotor along the shaft and through which the cooling air flows from the air inlet to the air outlet, and a plurality of rotor bars extending along the shaft and to which current is supplied, and a sound insulating means for directing the cooling air flowing into the air outlet in a desired direction so as to decrease sound waves generated by circulation of the cooling air, the sound insulating means being arranged in the space between the coil ends of the stator coil and the inner circumferential surface of the housing, and being separated from the coil ends by a certain distance which is shorter than half the wavelength length of the sound waves generated by the cooling air having such a frequency that depends upon the sum obtained by multiplying the number of the rotor bars by the rotation number of the rotor.

The noise which is generated by the circulation of air for cooling the induction motor and caused by the motor itself rotated at high speed can be thus eliminated.

BRIEF DESCRIPTION OF THE DRAWINGS

FIG. 5A shows a third example of the air-cooled induction motor according to the present invention sectioned along the rotor shaft of the motor and symmetrical relative to the axial line of the rotor shaft;

FIG. 5B shows a part of the induction motor in FIG. 5A sectioned in a direction perpendicular to the rotor shaft of the motor;

FIG. 5C is an enlarged partly-sectioned view intended to explain how noises can be reduced by the third air-cooled induction motor shown in FIGS. 5A and 5B;

FIG. 6A shows a part of a variation of the third air-cooled induction motor sectioned along the rotor shaft of the motor and symmetrical relative to the axial line of the rotor shaft; and FIG. 6B shows a part of the induction motor in FIG. 6A sectioned in a direction perpendicular to the rotor shaft of the motor.

DETAILED DESCRIPTION OF THE PREFERRED EMBODIMENTS

Figure 1A:
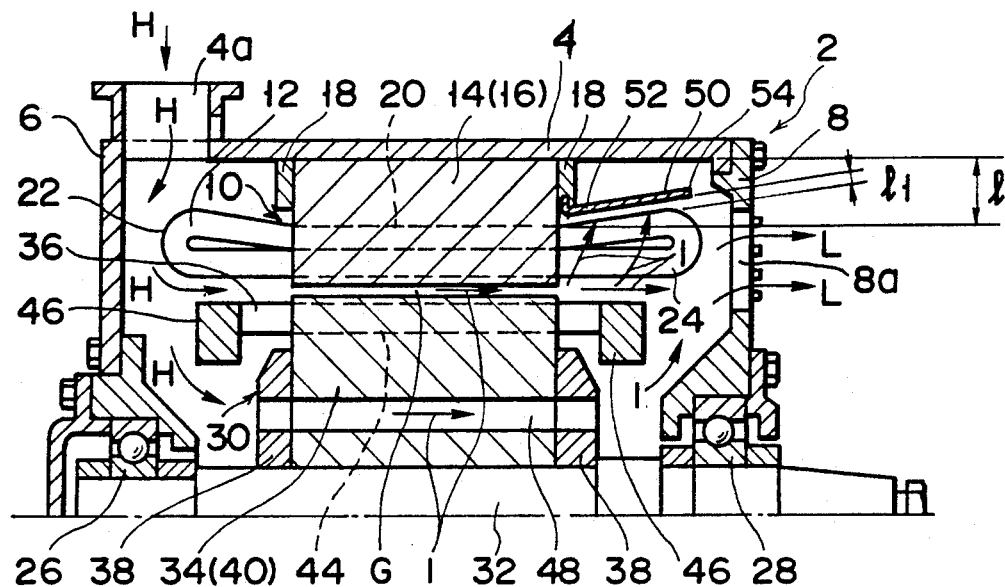
FIG. 1A shows a first example of the air-cooled induction motor according to the present invention sectioned along the rotor shaft of the induction motor and symmetrical relative to the axial line of the rotor shaft.
Figure 1B:
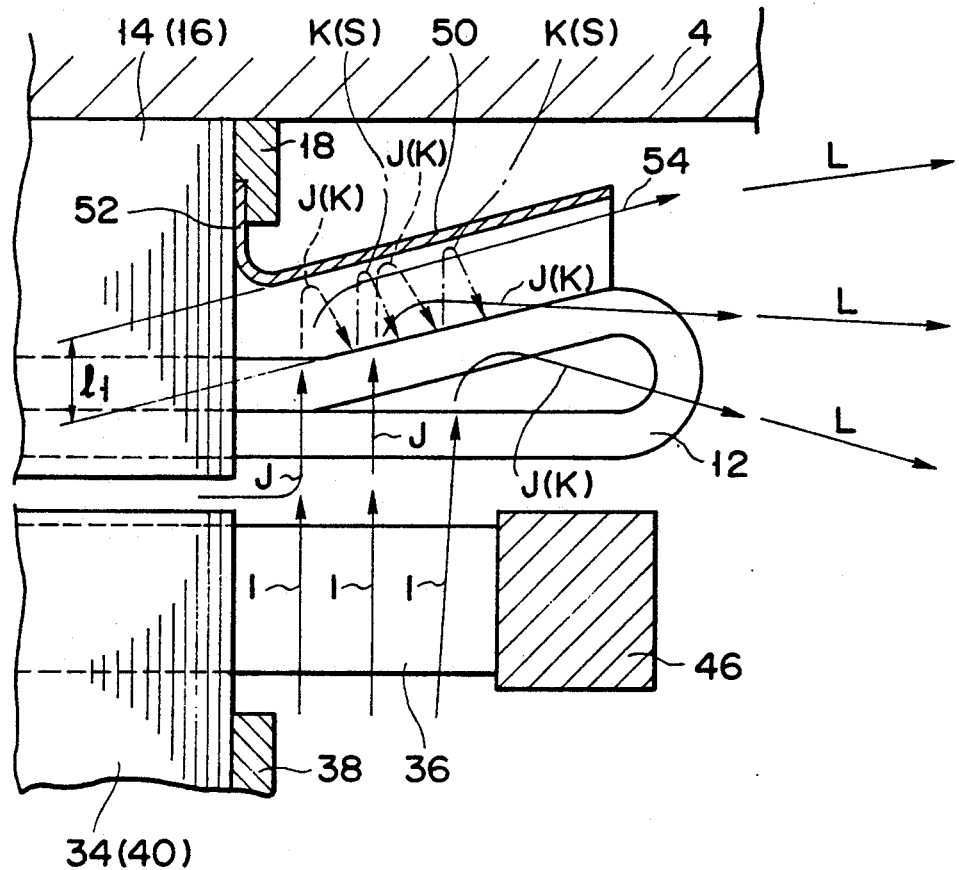
FIG. 1B is an enlarged partly-sectioned view showing a sound insulating plate and its adjacent area of the induction motor in FIG. 1A in more detail.

FIGS. 1A and 1B show a first example of the air-cooled squirrel-cage type induction motor according to the present invention. The squirrel-cage type induction motor 2 includes a cylindrical motor housing or frame 4 into which a stator 10 for generating a magnetic field is shrinkage-fitted and which is provided with a squirrel-cage type rotor 30 rotatably supported inside the stator 10. The stator 10 has stator coils 12 to which current is supplied to generate the magnetic field, and stator core 14 for supporting the stator coils 12. The cylindrical frame 4 has an air inlet port 4a, an end plate 6 at its one open end and another end plate 8 having an air outlet port 8a at its other open end along its axial line around which the rotor 30 is rotated. The stator core 14 is formed by stacking a large number of thin iron plates 16 one upon the other to each of which insulating matter is laminated. The stator core 14 is fixed to the inner circumference of the frame 4 by means of holder members 18. A plurality of slots 20, parallel to the shaft of the frame 4, are formed in the inner circumferential portion of the stator core 14. The stator coils 12 are incorporated into the slots 20 in the stator core 14. The stator coil 12 directs its one end 22 in a direction parallel to the axial direction in which the stator core 14 is rotated and its another end 24 in a direction reverse to that direction in which the one end 22 of the stator coil 12 is directed. Bearings 26 and 28 are located at center portions of the end plates 6 and 8 of the frame 4.

The squirrel-cage type rotor 30 includes a rotor or motor shaft 32 passing through its center, a rotor core 34 provided with a plurality of rotor bars 36 each formed by a copper band and arranged at a same interval, and two rotor holder members 38 for sandwiching the rotor core 34 between them. The rotor shaft 32 is smoothly rotatably supported by the bearings 26 and 28 located at the center portions of the end plates 6 and 8. The rotor core 34 is formed by stacking a large number of thin iron plates 40 one upon the other to each of which insulating matter is laminated. The rotor core 34 is fixed to the rotor shaft 32 by the holder members 38. A plurality of slots 44 are formed in the outer circumferential portion of the rotor core 34. The rotor bars 36 are incorporated into the slots 44 of the rotor core 34. One end of each of the rotor bars 36 is directed in a direction parallel to the axial direction in which the rotor core 34 is rotated while the other end thereof in a direction reverse to that direction in which the one end of the rotor bar 36 is directed. Both ends of each of the rotor bars 36 are connected to each other by short-circuit or end rings 46. A gap G is formed between the outer circumference of the rotor core 34 and the inner circumference of the stator core 14. A plurality of ventilating holes 48 extend along the axial line around which the rotor core 34 and its holder members 38 are rotated, passing through the rotor core 34 and its holder members 38.

The air-cooled induction motor 2 further includes, between the frame 4 and the stator coils 12, a sound insulating plate 50 for preventing sound waves from being amplified. The sound insulating plate 50 is made of a metallic or non-metallic material and formed like a ring, extending along the outer circumference of the stator coils 12 and in the circumferential direction of the frame 4. The sound insulating plate 50 has at one end thereof a flange 52, which is fitted into the inner circumference of the stator core holder member 18 and fixed between the frame 4 and the stator coils 12 by pressing the holder member 18 against one end face of the stator core 14. The sound insulating plate 50 is tapered, spreading more and more as it comes from its one end at which the flange 52 is formed nearer to its other open end 54, and it serves as a centrifugal fan for exhausting high pressure pulsating air current K, which is blown out of slit-shaped clearances at the stator coils 12, outside through its open end 54 as exhausted air current L when the rotor bars 36 are rotated at high speed.

It will be now studied how sound waves (or noise) S having a specific frequency are generated in the induction motor.

The both ends of each of the rotor bars 36 are projected from the both ends of the rotor core 34. When the rotor 30 is rotated, therefore, cooling wind H is sucked through the air inlet port 4a into the motor 2 and circulates toward the air outlet port 8a to generate wind I which has relatively high pressure. The high pressure wind I blows through the motor 2, as if it were a centrifugal fan, from the center of the rotor 30 or rotor shaft 32 in a direction or radial direction perpendicular to the shaft 32. Each of the rotor bars 36 has a relatively large thickness to create a sectional area necessary enough to serve as a copper conductor. It is therefore well-known that the high pressure wind I becomes pulsating air current J whose maximum value changes as time changes. It is also well-known that the vibration v or frequency f of the pulsating air current J depends upon that product which is obtained by multiplying the number of the rotor bars 36 by the rotation number of the rotor 30. The stator coil 12, its copper wire occupying a large ratio of its sectional area, being curved to enter into a next slot and formed like a circumference in the stator 10, serves to exhaust the pulsating air current J, which is discharged through the rotor 30, in the outer circumferential direction of the motor 2 as high pressure pulsating air current K. The high pressure pulsating air current K is rapidly diffused in a hollow formed outside the stator coils 12 to generate sound wave S which cause noise. The high pressure pulsating air current K or sound waves is reflected by the inner wall of the frame 4 and again returned back to those portions of the stator coils 12 where the high pressure pulsating air current K is exhausted. The high pressure pulsating air current K thus returned is again directed toward the frame 4 together with its following high pressure pulsating air current K and then reflected by the frame 4. The high pressure pulsating air current K is therefore reciprocated between the inner wall of the frame 4 and the outer circumferential portions of the stator coils 12. The inner wall of the frame 4 and the outer circumferential portions of the stator coils 12 cooperate this time to serve as if they were a resonance box. The sound waves (or noise) which is S generated by the high pressure pulsating air current K is thus gradually amplified to become noise uncomfortable to the ears of the human being. It has been confirmed by tests that this amplifying of the sound waves S is increased particularly at the time when the distance l of the inner wall of the frame 4 relative to the outer circumferential portion of the stator coils 12 is about 0.5 or 1 times the wavelength $\lambda$ of the sound waves S. The pulsating air current J, high pressure pulsating air current K and sound waves S cannot be distinguished from one another. Therefore, they are denoted by J(K) or K(S), for example, in the accompanying drawings).

The position of the sound insulating plate 50 to be located or the distance of the sound insulating plate 50 relative to the outer face of the stator coils 1 will now be studied. As described above, the sound waves (or noise) S is generated by the pulsating air current K and its frequency is defined by the product obtained by multiplying the number of the rotor bars 36 by the rotation number of the rotor 30. The frequency f of the sound waves S which are feared to become noise is therefore defined as follows: Assuming that the number of the rotor bars 36 is 26 (smallest in the case of the now-available induction motors) and that the rotation number of the rotor 30 is 3000 r.p.m. (smallest of those rotation numbers of the induction motor which make the human being hear noise), $$f_L = 26 \times 3000/60 = 1300 Hz$$

Assuming that the number of the rotor bars 36 is 46 (common in the now-available inductor motors) and that the rotation number of the rotor 30 is 7000 r.p.m. (largest in the now-available induction motors), $$f_U = 46 \times 7000/60 = 5366 Hz$$

The most popular speed range in which the induction motor 2 is rotated is obtained when the rotor 30 is rotated at a speed of 5000 r.p.m. When the number of the rotor bars 36 is 46, therefore, $$f_N = 46 \times 5000/60 = 3833 Hz$$

(subscripts L, U and N annexed in the above-cited equations denote the smallest rotation number of the rotor 30 which make the human being hear noise, the largest rotation number of the motor, and the most popular speed range in which the motor is rotated).

On the other hand, it has been confirmed by tests that the amplifying of the sound waves S is increased to the greatest extent particularly at the time when the distance l between the inner wall of the frame 4 and the outer circumferential portion of the stator coils 12 is about 0.5 or 1 times the wavelength $\lambda$ of the sound waves S. It is therefore preferable that the sound insulating plate 50 is located at a position where the distance l between the inner wall of the frame 4 and the outer circumferential portion of the stator coils 12 becomes smaller than 0.5 times or larger than 1 time the wavelength $\lambda$ of the sound waves S. In other words, the sound insulating plate 50 is located at a position where a distance $l_1$ measured from the outer face of the stator coils 12 is considerably smaller than half the wavelength $\lambda$ of the sound waves S which has the frequency f. (Numerals 1, 2 and 3 annexed in the following represent the first, second and third examples of the induction motor 2 according to the present invention).

Wavelength $\lambda_L$ of the lowest frequency $f_L$ relating to the sound waves S which are feared to become noise is as follows:

$$\lambda_L = 330000 (mm/sec)/1300(1/sec) = 254 mm$$

Therefore, distance $l_{1L}$ of the sound insulating plate 50 relative to the outer face of the stator coils 12 is preferably as follows:

$$254 \times 0.5 = 127 mm > l_{1l}$$

Wavelength $\lambda_N$ of frequency $f_N$ relating to the sound waves S which is created at the time when the motor are normally operated is as follows:

$$\lambda_N = 330000(mm/sec)/3833(1/sec) = 86.1 mm$$

Therefore, distance $l_{1N}$ of the sound insulating plate 50 relative to the outer face of the stator coils 12 is more preferably defined as follows:

$$86.1 \times 0.5 = 43 mm > l_{1n}$$

In addition, wavelength $\lambda_U$ of the highest frequency $f_U$ relating to the sound waves which are created at the time when the rotation number of the rotor 30 is the largest is calculated as follows:

$$\lambda_U = 330000 (mm/sec)/5367(1/sec) = 61.5 mm$$

Therefore, distance $l_{1U}$ of the sound insulating plate 50 relative to the outer face of the stator coils 12 is gained as follows:

$$61.5 \times 0.5 = 30 mm > l_{1u}$$

However, the distance $l_{1L}$ of the sound insulating plate 50 relative to the outer face of the stator coil 12 when the frequency is the lowest $f_L$ becomes about 2 times the distance $l_{1U}$ of the sound insulating plate 50 and it is therefore feared that the noise S is increased at the time when the speed of the motor is in the low speed range. Therefore, the distance $l_1$ of the sound insulating plate 50 relative to the outer face of the stator coils 12 is practically defined in such a way that the sound insulating plate 50 can function most effectively at the frequency $f_N$ of the sound waves S which are generated at the time when the motor is normally operated. When the distance $l_1$ becomes too short, it is feared that the sound insulating plate 50 prevents cooling or high pressure wind H, which serves to cool the motor 2, from easily passing through the motor 2. The distance $l_1$ of the sound insulating plate 50 relative to the outer face of the stator coil 12 must be therefore kept longer than at least 10 mm. It has been confirmed by results of various tests that the distance $l_1$ is the optimum when it is in a range of 20-35 mm.

This sound insulating plate 50 can prevent the sound waves S, which are generated when the rotor 30 is rotated, from being amplified. More specifically, when the rotor bars 36 are rotated and the high pressure pulsating air current K is thus generated, the air current K is introduced to the sound insulating plate 50, passing between the stator coils 12. This high pressure pulsating air current K is reflected by the sound insulating plate 50 which is separated from the outer face of the stator coils 12 by the distance $l_1$. It is thus made different in phase from its following high pressure pulsating air currents which will be successively generated. When this pulsating air current K whose phase has been changed is struck against its following pulsating air current, the sound waves S can be prevented from being amplified.

The sound insulating plate 50 is tapered, spreading more and more from its flange 52 to its open end 54, and this enables the pulsating air current K to be more quickly exhausted from the air outlet port 8a, as exhausted current L, along the tapered portion of the sound insulating plate 50.

The space between the stator coils 12 and the frame 4 is made narrower by the sound insulating plate 50 than in the case of the conventional motors. When the pulsating air current K is to be exhausted outside as the exhausted current L, it passes through an inner of stator coils 12 to thereby cool the motor 2 to a greater extent.

Figure 2:
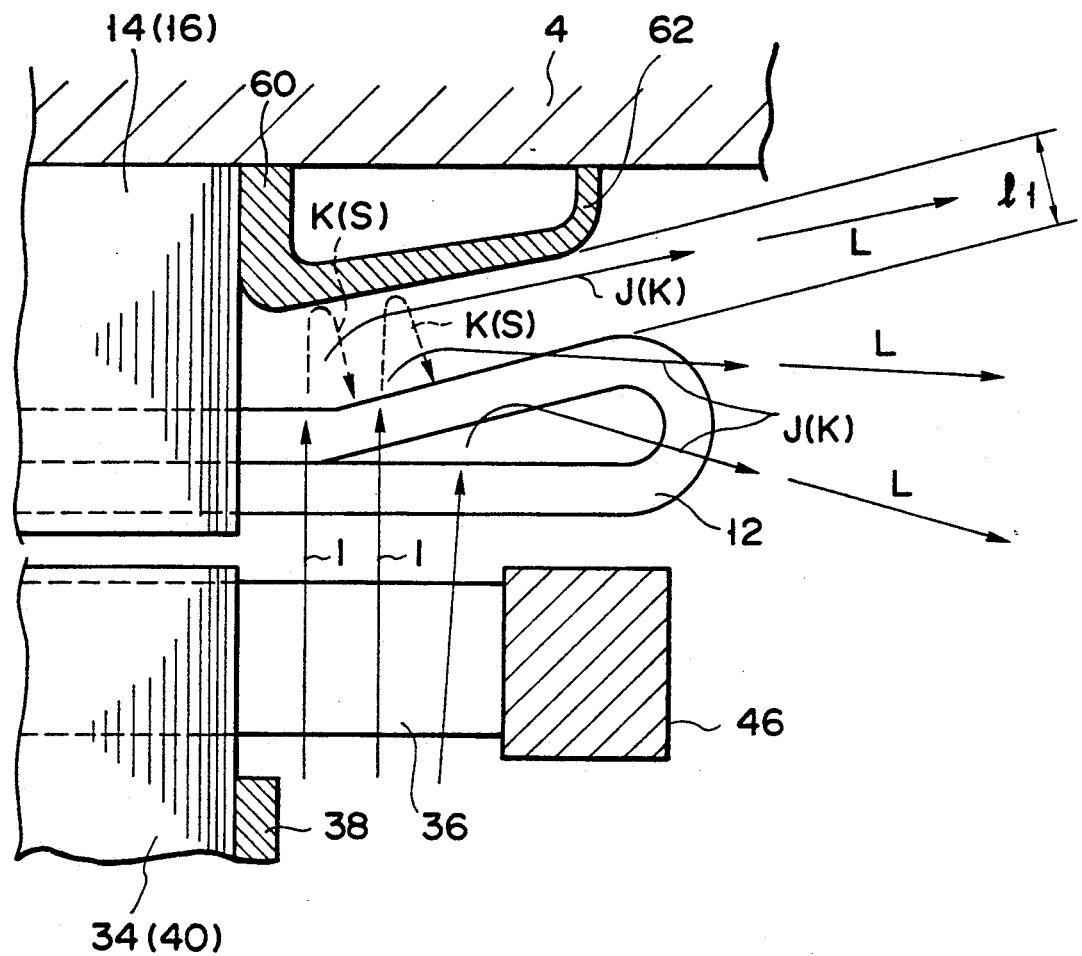
FIG. 2 is an enlarged partly-sectioned view showing a variation of the first air-cooled induction motor according to the present invention, in which a sound insulating plate and its adjacent area of the motor are shown in more detail.

FIG. 2 shows a variation of the sound insulating plate shown in FIGS. 1A and 1B. The same components as those in FIGS. 1A and 1B will be represented by the same reference numerals. According to this variation of the sound insulating plate, it is formed integral to one of the holder members or stator core holder members 60 which serve to fix the stator core 14 to the inner circumference of the frame 4. The core holder member 60 presses the stator core 14 inward by its one end while it allows the high pressure wind I blown through the gap G to be exhausted at an interval of the predetermined distance $l_1$. That end 62 of the core holder member 60 which is located opposite to the stator core 14 is bent to contact with and fix to the frame 4. Even when the rotor shaft 32 or rotor bars 36 rotates or the induction motor 2 vibrates, therefore, a rigid sound insulating plate which neither vibrates nor contacts the rotor 30 can be provided.

Figure 3A:
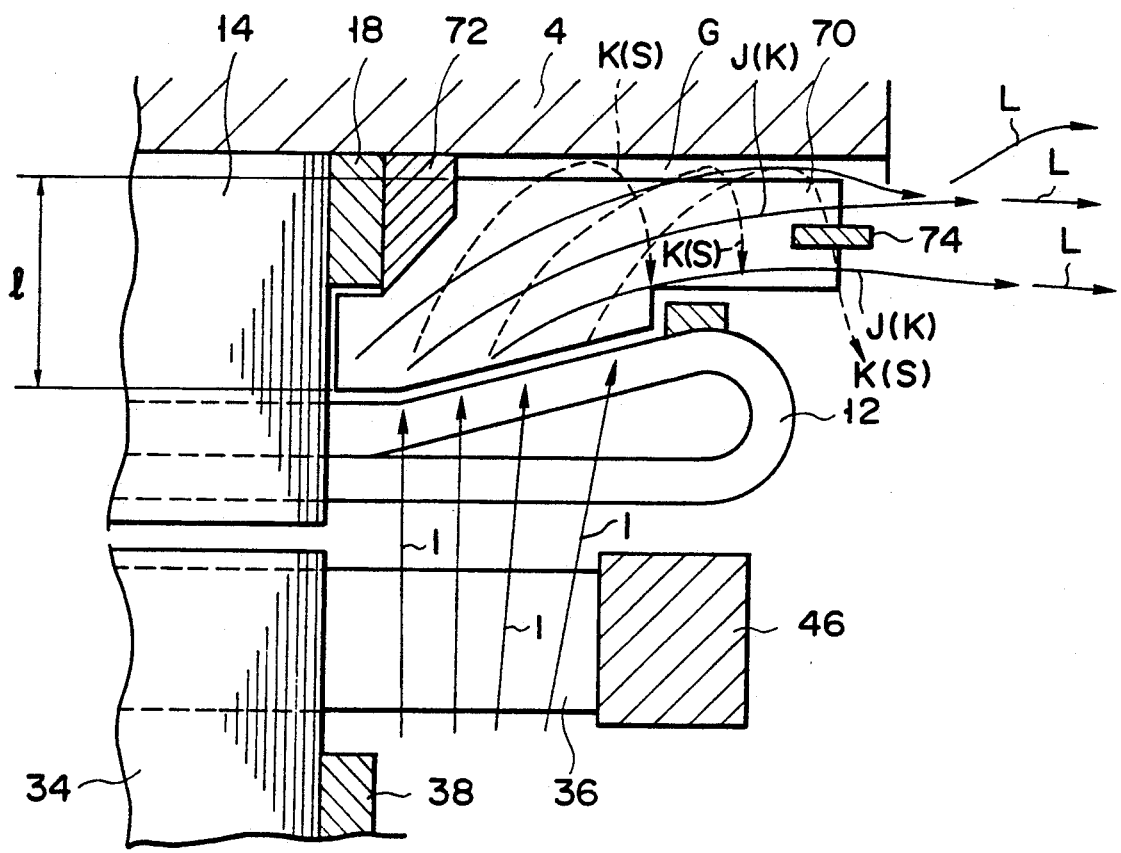
FIG. 3A shows a part of a second example of the air-cooled induction motor according to the present invention sectioned along the rotor shaft of the motor and symmetrical relative to the axial line of the rotor shaft.
Figure 3B:
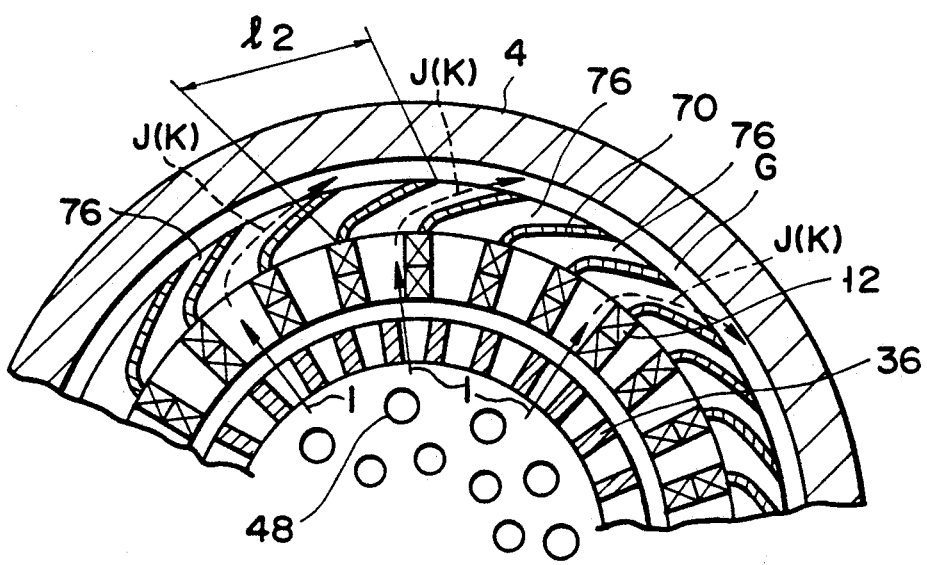
FIG. 3B shows a part of the second air-cooled inductor motor according to the present invention sectioned in a direction perpendicular to the rotor shaft of the motor.

FIGS. 3A and 3B show a second example of the aircooled squirrel-cage type induction motor according to the present invention. The same components as those in FIGS. 1A and 1B will be denoted by the same reference numerals.

According to this second example, sound wave induction plates 70 each being formed by a plurality of thin plates, having a relatively long length $l_2$ when it is developed, and serving to extinguish the sound waves (or noise) S generated by the rotating rotor 30, are arranged in a space defined by the stator coils 12 and the rotor 30 in the frame 4. The sound wave induction plates 70 are supported, directing in a same direction, by induction plate bosses 72, each of which is fixed to one of the stator holder members 18 at one end thereof, and they are assembled as a part of the frame 4 or integral to the frame 4 because their bosses 72 are fixed to the frame 4. That end of the sound wave induction plates 70, which are located opposite to its end fixed to the stator holder member 18, is provided with a stopper 74 for preventing each of the sound wave induction plates 70 to contact the others while vibrating. The sound wave induction plates 70 are incorporated into the induction plate bosses 72 and the stopper 74 which are two- or four-divided in a direction perpendicular to the rotor shaft 32. The sound wave induction plates 70 are arranged enclosing the rotor shaft 32 because the induction plate bosses 72 and the stoppers 74, each of which is two- or four-divided, are fixed to the frame 4 in the circumferential direction of the frame 4.

As already described above, the high pressure wind I is generated by the rotating rotor bars 36. The pulsating air current K is caused by the high pressure wind I which passes through the stator coils 12. The pulsating air current K is introduced into cooling wind passages 76 formed by the sound wave induction plates 70, guided along the curved passages 76 and discharged, as the discharged air current L, into the gap G between the frame 4 and the sound wave induction plates 70. However, a part of the pulsating air current K is reflected by the inner circumference of the frame 4 and is again introduced to the rotor shaft 32. When each of the passages 76 and the gap G are sufficiently large (or wide) in this case, it is well known that the sound waves (or noise) S kill one another to become reduced to a greater extent because the pressure of the pulsating air current K (or sound waves S) is reduced or pressure directed in the reverse direction is generated. When the passages 76 and the gap G are not large (or wide) enough or none of the passages 76 and the gap G are present, the pulsating air current K (or sound waves S which are uncomfortable to the ears of the human being) is introduced, as it is, to the rotor shaft 32.

Because the sound wave induction plates 70 is shaped like a spiral, the passages 76 and the gap G can be kept sufficiently large or wide. As already described above, the distance l between the inner wall of the frame 4 and the outer circumference portion of the stator coils 12 which are feared to form a resonance box can be made sufficiently long relative to the wavelength of the sound waves S which are suspected to originate noise. The amplifying of the sound waves S is increased particularly when the distance becomes about 0.5 or 1 times the wavelength λ of the sound waves S. The distance $l_2$ is therefore made sufficiently larger than 1 time the wavelength of the sound waves S which has such frequency that causes noise. This prevents the pulsating air current K (or sound waves S), which has been reflected by the inner wall of the frame 4, from being amplified and the occurrence of the noise S which is uncomfortable to the ears of the human being can be thus prevented.

When the passages 76 and the gap G are made sufficiently large (or wide), it is feared that the pulsating air current K (or sound waves S) is amplified at the time when the motor 2 is rotated at a relatively low speed. When the motor 2 is rotated at a relatively low speed, however, the pressure of the pulsating air current K itself which causes such sound waves that are heard as noise to the ears of the human being becomes relatively small. The time during which the motor 2 is rotated at low speed corresponds to those time periods during which the vehicle is accelerated and decelerated, and these time periods occupy only a little part of that time during which the vehicle is being driven. It hardly happens therefore that the human being feels the sound waves as noise.

Figure 4:
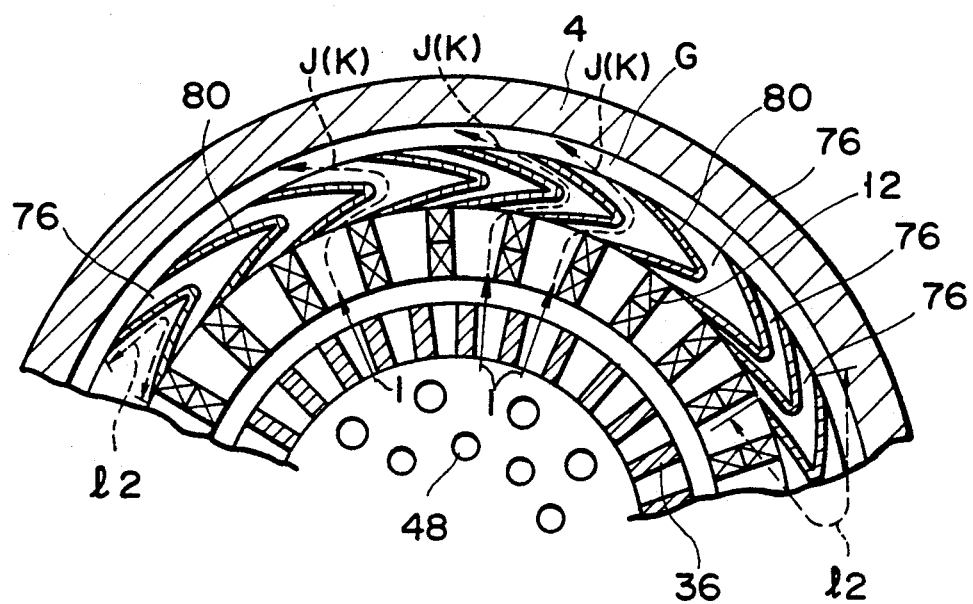
FIG. 4 is a partly-sectioned view showing a variation of the second air-cooled inductor motor according to the present invention, in which the motor is sectioned in a direction perpendicular to its rotor shaft.

FIG. 4 shows a variation of the sound wave induction plates. According to this variation, sound insulating plates 80 are shaped like a reversed L (it may be expressed that the plates 80 are shaped like a L depending upon the direction in which their section is viewed) when they are sectioned in a direction perpendicular to the rotor shaft 32. In these sound insulating plates 80, the distance $l_2$ can be made sufficiently long relative to the wavelength λ of the sound waves S which are feared to originate noise.

FIGS. 5A and 5B show a third example of the air-cooled squirrel-cage type induction motor according to the present invention. The same components as those in FIGS. 1A and 1B will be denoted by the same reference numerals.

According to this third example, sound wave induction blocks 90 which serve to extinguish the sound waves (or noise) S generated by the rotating rotor 30 are formed in the space between the stator coils 12 and the frame 4. Each of the sound wave induction blocks 90 is formed by piling plural cylindrical or polygonal hollow pipes in a plurality of layers in a direction perpendicular to the rotor bar 36 (or in the circumferential direction of the motor 2), and their lengths $l_{92}$, $l_{94}$, $l_{96}$ and $l_{98}$ are different for every layer (numerals 92, 94, and 98 annexed denote the layers of the pipes).

According to this sound wave induction blocks 90, the cooling wind I or high pressure pulsating air current K blown from the rotor 30 to the stator 10 is introduced into the pipes in the layers 92, 94, 96 and of the blocks 90. The pipes in one layer are different in length from those in the other layers. Therefore, the pulsating air current K is exhausted as the exhausted air current L after it is divided by the pipes in the layers 92, 94, 96 and 98, and its time needed to pass through them is changed by them. As apparent from FIG. 5C, the pulsating air current K which has passed through the pipes in the layers 92–98 is exhausted under the state that it is dispersed. The distance between the inner wall of the frame 4 and the outer circumferential portion of the stator coils 12 which serves to act as the resonance box can be thus changed at random relative to the wavelength of the sound waves S which are supposed to generate noise. In other words, the amplifying of the sound waves S comes to its peak particularly at the time when the distance l is about 0.5 or 1 times the wavelength λ of the sound waves S. When the lengths of the pipes in the layers 92–98 are made shorter than 0.5 times and/or longer than 1 time the wavelength λ of the sound waves S, therefore, the noise S which is uncomfortable to the ears of the human being can be prevented from being caused.

FIG. 6A and 6B show a variation of the third example according to the present invention. Each of sound insulating blocks 100 includes a plurality of sound insulating plates 102, 104, 106 and 108 having lengths $l_{102}$ (not seen in FIG. 6B), $l_{104}$, $l_{106}$ and $l_{108}$ which are different in a direction perpendicular to the rotor bar 36 (or in the circumferential direction of the frame 4), and also having widths $W_{102}$, $W_{104}$, $W_{106}$ and $W_{108}$ which are different in a direction parallel to the rotor bar 36 (or in the axial direction of the frame 4). The cooling wind I or high pressure pulsating air current K blown from the rotor 30 to the stator 10 is introduced to the sound insulating plates 102–108 which have different lengths and widths and whose lengths and widths are made shorter than 0.5 times and/or longer than 1 time the wavelength λ of the sound waves S generated by the pulsating air current. The high pressure pulsating air current K introduced to the sound insulating plates 102–108 is exhausted to different positions both in the circumferential and axial directions of the motor 2. This prevents the pulsating air current K (or sound waves S) from being amplified, so that the occurrence of the noise S which is uncomfortable to the ears of the human being can be prevented.

What is claimed is:

1. An air-cooled type induction motor for use in vehicles comprising:

a cylindrical housing having an axis, an air inlet into which cooling air is supplied, and an air outlet through which the cooling air is exhausted;

a stator for generating a magnetic field, said stator including an annular core coaxially fitted in said housing and located between the air inlet and the air outlet, and a plurality of stator coils having coil ends which extend from the core to the air outlet and which face to the inner circumferential surface of said housing with a space therebetween;

a rotor coaxially arranged inside the core with a predetermined gap through which the cooling air flows from the air inlet to the air outlet and rotatable about the axis of said housing, said rotor having a shaft coaxial with the axis of said housing, a plurality of ventilating holes extending through said rotor along the shaft and through which the cooling air flows from the air inlet to the air outlet, and a plurality of rotor bars extending along the shaft; and a sound insulating means for directing the cooling air flowing into the air outlet in a desired direction so as to decrease sound waves generated by circulation of the cooling air, said sound insulting means being arranged in the space between the coil ends of the stator coil and the inner circumferential surface of said housing, and being separated from the coil ends by a certain distance which is shorter than half the wavelength of the sound waves generated by circulation of the cooling air having such a frequency that depends upon the product obtained by multiplying the number of the rotor bars by the rotation number of said rotor.

2. The induction motor according to claim 1, wherein said sound insulating means is slightly tapered as it extends from said rotor nearer to said housing.

3. The induction motor according to claim 2, wherein said sound insulating means has a substantially U-shaped section when it is sectioned in a direction parallel to the axis, of said housing and it is arranged like a circumference along the inner circumference of said housing.

4. The induction motor according to claim 1, wherein the distance l between the coil ends and sound insulating means is defined as follows:

$$l < 60 \times V/(2 \times N \cdot B)$$

in which V denotes the speed (mm/sec) of the sound waves advancing in the air, N denotes the rotation number (r.p.m.) of said rotor and B denotes the number of the rotor bars.

5. An air-cooled type induction motor for use in vehicles comprising:
  a cylindrical housing having an axis, an air inlet into which cooling air is supplied, and an air outlet through which the cooling air is exhausted;
  a stator for generating a magnetic field, said stator including an annular core axially fitted in said housing and located between the air inlet and the air outlet, and a plurality of stator coils having coil ends which extend from the core to the air outlet and which face to the inner circumferential surface of said housing with a space therebetween;
  a rotor coaxially arranged inside the core with a predetermined gap through which the cooling air flows from the air inlet to the air outlet and rotatable about the axis of said housing, said rotor having a shaft coaxial with the axis of said housing, a plurality of ventilating holes extending through said rotor along the shaft and through which the cooling air flows from the air inlet to the air outlet, and a plurality of rotor bars extending along the shaft; and
  at least one sound insulating means for directing the cooling air flowing into the air outlet in a desired direction so as to decrease sound waves generated by circulation of the cooing air, each of said sound insulating means being arranged in the space between the coil ends of the stator coil and the inner circumferential surface of said housing, each of said sound insulating means being shaped like a fin in section and the length of each of said sound insulating means sectioned and developed in the circumferential direction being longer than the wavelength of the sound waves generated by the cooling air having such a frequency that depends upon the product obtained by multiplying the number of the rotor bars by the rotation number of said rotor.

6. The induction motor according to claim 5, wherein each of said sound insulating means is shaped radial relative to the rotor shaft when it is sectioned in the circumferential direction, and they are formed like a spiral around the rotor shaft.

7. The induction motor according to claim 6, wherein each of said sound insulating means is shaped radial relative to the rotor shaft when it is sectioned in the circumferential direction, and they are formed like a spiral around the rotor shaft and at least a part of each of them is folded.

8. The induction motor according to claim 5, wherein the length K of said sound insulating means sectioned and developed in the circumferential direction is defined as follows:

$$K > 60 \times V/(N \cdot B)$$

in which V denotes the speed (mm/sec) of the sound waves advancing in the air, N denotes the rotation number (r.p.m.) of said rotor and B denotes the number of the rotor bars.

9. An air-cooled type induction motor for use in vehicles comprising:
  a cylindrical housing having an axis, an air inlet into which cooling air is supplied, and an air outlet through which the cooling air is exhausted;
  a stator for generating a magnetic field, said stator including an annular core coaxially fitted in said housing and located between the air inlet and the air outlet, and a plurality of stator coils having coil ends which extend from the core to the air outlet and which face to the inner circumferential surface of said housing with a space therebetween;
  a rotor coaxially arranged inside the core with a predetermined gap through which the cooling air flows from the air inlet to the air outlet and rotatable about the axis of said housing, said rotor having a shaft coaxial with the axis of said housing, a plurality of ventilating holes extending through the rotor along the shaft and through which the cooling air flows from the air inlet to the air outlet, and a plurality of rotor bars extending along the shaft; and
  a plurality of sound insulating means for directing the cooling air flowing into the air outlet in a desired direction so as to decrease sound waves generated by circulation of the cooling air, said plurality of sound insulating means being arranged in the space between the coil ends of the stator coil and the inner circumferential surface of said housing, said plurality of sound insulating means being different in both length and area and arranged such that a sound insulating means which is shortest and which has the smallest area is located closest to the rotor shaft and a sound insulating means which is longest and has the largest area is located closest to the housing.

10. The induction motor according to claim 9, wherein said sound insulating means includes pipes each of which is shaped cylindrical or polygonal in section when it is sectioned in the axial direction.

11. The induction motor according to claim 10, wherein the pipes are shaped like a honeycomb in section when it is sectioned in the axial direction.

12. The induction motor according to claim 9, wherein said sound insulating means includes a plurality of waveguide plates having lengths different in those directions which are parallel and circular to the axis.

13. The induction motor according to claim 12, wherein a piece of waveguide plate which has the shortest length in the direction parallel to the axis of said housing is positioned nearest to said rotor and a waveguide plate which has the length K is defined by $$K < 60 \times V/(N \cdot B)$$

in which V denotes the speed (mm/sec) of the sound waves advancing in the air, N denotes the rotation number (r.p.m.) of said rotor and B denotes the number of the rotor bars, and which has the shortest length in the direction circular to the axis is positioned nearest to the axis.

14. The induction motor according to claim 12, wherein a piece of waveguide plate which has the longest length in the direction parallel to the axis is positioned nearest to said housing and a waveguide plate which has the length K is defined by $$K > 60 \times V/(N \cdot B)$$

in which V denotes the speed (mm/sec) of the sound waves advancing in the air, N denotes the rotation number (r.p.m.) of said rotor and B denotes the number of the rotor bars, and which has the longest length in the direction perpendicular to the axis is positioned nearest to said housing.

* * * * *